3,230,140
METHOD OF TREATING OPEN WOUNDS
Janice A. Mendelson, Edgewood Arsenal, Md., and Floyd
B. Brinkley, 1229 N. Curley St., Baltimore, Md.
No Drawing. Filed Sept. 26, 1962, Ser. No. 227,120
1 Claim. (Cl. 167—58)
(Granted under Title 35, U.S. Code (1952), sec. 266)

The invention described herein may be manufactured and used by or for the Government of the United States of America for governmental purposes without the payment to us of any royalty thereon.

This invention relates to a therapeutic composition which is useful for topical treatment of contaminated open wounds.

The composition consists of a combination of penicillin combined with a specific sulfa drug. More specifically, the composition of this invention is made of a combined solution or a combined powder of buffered potassium penicillin G and an acid salt of 4-amino-methylbenzene-sulfonamide.

These acid salts can be the hydrochloride, acetate, citrate, tartarate and mandelate of the above sulfonamide.

bines members of the first group one often finds synergism, when one combines members of the second group one often finds indifferent results, when one combines members of the first and second groups one often finds antagonism.

We have found that when mafenide is combined with a buffered potassium penicillin G solution, there is produced a solution which greatly prolongs the life (or produces survivors) of animals with experimental wounds which are of such a character that death from *Clostridium perfringens* results in 24 to 36 hours in the control animals.

Thus, our composition is useful to treat animals with wounds susceptible to fatal clostridial infection. It could be applicable to battle casualties in a combat zone and mass casulty situations when optimum surgical therapy is not available since in these cases the treatment can be administered by non-professional personnel with a simple hand operated atomizer or a pressurized spray can.

The results of our experiments are shown in the following table using goats as the experimental animal. These animals were selected because they are a large animal and they came from a carefully selected stock of castrated Angora goats of approximately the same age and weight.

| Treatment | Number of Goats | Survival Time in Hours | | | Survivors | | | |
|---|---|---|---|---|---|---|---|---|
| | | Median | Mean | Range | Over 100 hrs. | Over 200 hrs. | Over 400 hrs. | Over 600 hrs. |
| Controls | 6 | 34.3 | 37.1 | 22.9 – 51.1 | 0 | 0 | 0 | 0 |
| Penicillin | 6 | 102.1 | 110.7 | 65.9 – 138.7 | 4 | 0 | 0 | 0 |
| 5% mafenide | 6 | 69.8 | 144.9 | 24.3 – 388.0 | 4 | 1 | 0 | 0 |
| 20% mafenide | 6 | 154.6 | 158.0 | 38.3 – (*) | 4 | 3 | 1 | 1 |
| 5% mafenide and penicillin | 6 | 115.1 | 254.6 | 20.1 – 519.4 | 4 | 4 | 2 | 0 |
| 20% mafenide and penicillin | 6 | 484.8 | 499.3 | 345.6 – (*) | 6 | 6 | 6 | 3 |

*Indicates some goats still alive.

The 4-amino-methylbenzenesulfonamide is also known as a mafenide, marfanil, 4-homosulfanilamide, homosulfamine, alpha-amino-p-toluene sulfonamide. The compound is shown and described in the patent to Klarer No. 2,288,531.

The prior art shows that the combination of penicillin with sulfa drugs is not new. Penicillin has been combined with sulfadiazine, sulfamerazine, sulfamethazine, sulfathiazole, and sulfanilamide, separately and combined. In these prior art combinations the drugs were combined in solution for intravenous or intramuscular administration. It is also known to use a mixture of powdered penicillin and sulfa drugs other than the present one for topical application.

This invention differs from the prior art in that it combines penicillin with the above specific sulfa drug for topical application by means of spraying the combined mixture on the wound.

As far as we are aware, this specific combination is not shown in the prior art. As a matter of fact the prior art teaches that such a combination might be expected to produce antagonism rather than synergism. In the article by Julius and Gaikhorst entitled, "Effects of Combining Antibiotics," Antibiotics and Chemotherapy 6:287–296 (1958), the authors come to the conclusion that chemotherapeutic drugs can be divided into two classes:

(1) The more bactericidal ones such as penicillin and streptomycin.

(2) The more bacteriostatic ones such as the tetracyclines and the sulfonamides.

The authors then indicate that based on their observations of synergism among antibiotic drugs when one com- In the above table, "5% mafenide" and "20% mafenide" means 5 and 20% by weight of mafenide hydrochloride in 50 ml. of sterile water was sprayed on the wounds immediately after wounding and twice daily thereafter. "5% mafenide and penicillin" and "20% mafenide and penicillin" means that the mafenide solutions had 2,000,000 units (1.2 grams) of buffered potassium penicillin G added to them. Thus, the mixtures of mafenide and penicillin G were composed of approximately 5% mafenide–2.4% penicillin G and 20% mafenide–2.4% penicillin G, respectively. "Penicillin" means that 2,000,000 units of the above penicillin was added to 50 ml. of sterile water and sprayed on the wounds as above.

It is evident from the table that we have provided a combination of mafenide and penicillin which provides a greatly increased survival time for wounds which when untreated invariably develop anaerobic infection and which are invariably fatal. The median survival time and the number of survivors lasting over 100 hours, 200 hours, 400 hours, and 600 hours, plus the fact that some animals survived indefinitely (apparently recovered), clearly indicates that this surprising result is a true potentiation or a synergistic effect.

Other penicillins that can be used in our composition are the potassium or sodium salts of penicillin AT, S, and V.

We claim:

In the method of treating open wounds to combat anaerobic infections which comprises spraying said wounds with an aqueous penicillin-containing solution, the improvement which consists essentially of the step in spraying said wound with an aqueous solution consisting of approximately 20% by weight of p-aminomethyl benzene sulfonamide hydrochloride and approximately 2.4% by weight of potassium penicillin G.

References Cited by the Examiner

FOREIGN PATENTS 810,518   3/1959   Great Britain.
885,435   12/1961   Great Britain.

OTHER REFERENCES

Brinkley et al.: "Effect of Local Penicillin Spray on Survival Time Following a Massive Open Wound," Antibiotics Annual 7:526–530 (1959–1960).

Chem. Abstracts 36, 5895 (2); (1942).
Chem. Abstracts 37, 3177 (5); 4473 (5); (1943).
Chem. Abstracts 38, 5968 (1); 6677 (4); (1944).
Chem. Abstracts 39, 2136 (3–4); (1945).
Chem. Abstracts 40, 134 (4); 1940 (6); 7398 (3); (1946).
Chem. Abstracts 41, 1321e; (1947).
Chem. Abstracts 42, 2024g; (1948).

Florey et al.: "Penicillin in War Wounds," Lancet, pp. 742–745, Dec. 11, 1943.

Gallego: "Interaction of Antibiotics," pp. 134–164, in Proceedings of the Fourth International Congress of Biochemistry, Vienna, 1958, vol. V, symposium V, published 1958 by Rergamon Press, Ldt.

Julius et al.: "The Effects of Combining Antibiotics," Antibiotics and Chemotherapy 8 (6); 287–296, June 1958.

Mason-Brown: "Early Closure of Soft Tissue Wounds With Chemotherapeutic Agents, a Comparative Study of Sulfanilimide and Penicillin," Brit. J. Surg. 32, pp. 140–3 (1944).

McIntosh et al.: "Chemotherapeutic Drugs in Anaerobic Infections of Wounds," Lancet, pp. 793–5 (1943).

McIntosh et al.: "Further Observations on the Chemotherapy of Experimental Gas Gangrene," Brit. J. Expt'l. Path. 27, pp. 46–54 (1946).

Mendelson, J. A. et al.: "Sulfamylon (Mafenide) and Penicillin as Expedient Treatment of Experimental Massive Open Wounds with C1. Perfringens Infections," J. Trauma 2; 239–261, May 1962.

Mendelson: "Topical Therapy as an Expedient Treatment of Massive Open Wounds," Surgery 48 (6); 1035–1047, December 1960.

Mitchell et al.: "Marfanil and Marfanil-Prontalbin," Lancet 246 (6298); pp. 627–629 (1944).

Northey: "The Sulfonamides and Allied Compounds," pp. 252–253, 389–404, 416–418, 473–480, 535–538, 552, 554–560, published 1948 by Reinhold Publishing Co., New York.

LEWIS GOTTS, *Primary Examiner.*

SHEP K. ROSE, *Assistant Examiner.*